United States Patent
Miyata et al.

(10) Patent No.: US 10,431,953 B2
(45) Date of Patent: Oct. 1, 2019

(54) LASER APPARATUS INCLUDING PLURALITY OF LASER MODULES

(71) Applicant: FANUC CORPORATION, Minamitsuru-gun, Yamanashi (JP)

(72) Inventors: Ryuusuke Miyata, Yamanashi (JP); Hiroshi Takigawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/937,170

(22) Filed: Mar. 27, 2018

(65) Prior Publication Data
US 2018/0294619 A1    Oct. 11, 2018

(30) Foreign Application Priority Data
Apr. 6, 2017 (JP) ................. 2017-075825

(51) Int. Cl.
| H01S 3/13 | (2006.01) |
| B23K 26/70 | (2014.01) |
| H01S 3/23 | (2006.01) |
| H01S 3/10 | (2006.01) |
| H01S 3/102 | (2006.01) |
| H01S 3/131 | (2006.01) |

(52) U.S. Cl.
CPC .......... *H01S 3/1305* (2013.01); *B23K 26/705* (2015.10); *H01S 3/1022* (2013.01); *H01S 3/10038* (2013.01); *H01S 3/2383* (2013.01); *H01S 3/10069* (2013.01); *H01S 3/1306* (2013.01); *H01S 3/1312* (2013.01)

(58) Field of Classification Search
CPC .. H01S 3/1305; H01S 3/10038; H01S 3/1022; H01S 3/2383; H01S 3/1306; H01S 3/10069; H01S 3/1312; B23K 26/705
See application file for complete search history.

(56) References Cited

U.S. PATENT DOCUMENTS

| 2015/0375337 A1 | 12/2015 | Hayashi |
| 2016/0322777 A1 | 11/2016 | Zediker et al. |
| 2017/0279246 A1* | 9/2017 | Muendel .............. B23K 26/703 |

FOREIGN PATENT DOCUMENTS

| JP | 2005317841 A | 11/2005 |
| JP | 2006-012888 A | 1/2006 |

(Continued)

*Primary Examiner* — Xinning (Tom) Niu
(74) *Attorney, Agent, or Firm* — RatnerPrestia

(57) ABSTRACT

A laser apparatus includes a plurality of laser modules, and includes a function for preventing a defect arising when switching the number of laser modules to be driven. The laser apparatus includes the plurality of laser modules, a combiner configured to combine laser beams from the plurality of laser modules, an optical output command section configured to generate a first optical output command for a combined laser beam, and a laser module selection/command section configured to select a laser module to be driven from the plurality of laser modules, based on the first optical output command and to generate a second optical output command for each of the laser modules that have been selected. The laser module selection/command section is configured to set a threshold value for a first optical output command to be different between when increasing and reducing the number of laser modules to be driven.

4 Claims, 2 Drawing Sheets

(56) References Cited

FOREIGN PATENT DOCUMENTS

| | | |
|---|---|---|
| JP | 2012-227353 A | 11/2012 |
| JP | 2017054931 A | 3/2017 |
| WO | 2014-133013 A | 9/2014 |
| WO | 2016060933 A1 | 4/2016 |

* cited by examiner

LASER APPARATUS INCLUDING PLURALITY OF LASER MODULES

CROSS-REFERENCE TO RELATED APPLICATION

This application is a new U.S. Patent Application that claims benefit of Japanese Patent Application No. 2017-075825, filed Apr. 6, 2017, the disclosure of this application is being incorporated herein by reference in its entirety for ail purposes.

BACKGROUND OF THE INVENTION

1. Field of the Invention

The present invention relates to a laser apparatus including a plurality of laser modules.

2. Description of the Related Art

An apparatus, that combines laser beams outputted from a plurality of laser modules (laser beam sources) and emits the obtained combined laser beam, is known in the related art (e.g., see JP 2006-012888 A).

Additionally, a technique is known, in a laser machining apparatus including a plurality of laser modules, in which the number of laser modules driven is adjusted on the basis of the output, a spot diameter, etc., of a combined laser beam (e.g., see JP 2012-227353 A and WO 2014/133013).

Individual laser modules have a lower limit with respect to the optical output at which the laser beam can be outputted stably, and thus adjusting of the number of laser-oscillating laser modules as appropriate is demanded in a laser apparatus including a plurality of laser modules, in order to ensure a broad optical output range. However, an optical output command value often changes during laser irradiation, and the number of laser modules to laser-oscillate changes frequently accordingly, which may destabilize the output.

SUMMARY OF THE INVENTION

One aspect of the present disclosure is a laser apparatus including: a plurality of laser modules; a laser power source section configured to drive each of the plurality of laser modules; a combiner configured to combine laser beams emitted by the plurality of laser modules and to output a combined laser beam; an optical output command section configured to generate a first optical output command with respect to the combined laser beam; a laser module selection/command section configured to select a laser module to be driven from the plurality of laser modules, based on the first optical output command and to generate a second optical output command for the laser module that has been selected; and a control section configured to control the laser module and the laser power source section, based on the second optical output command, wherein, with respect to switching the number of laser-oscillating laser modules, based on a change in the first optical output command, the laser module selection/command section is configured to set a second threshold value for the first optical output command, when increasing the number of laser-oscillating laser modules to N, to a value higher or lower, by a predetermined value, than a first threshold value for the first optical output command serving as a reference, when reducing the number of laser-oscillating laser modules from N.

BRIEF DESCRIPTION OF THE DRAWINGS

The objects, features and advantages of the invention will become more apparent from the following description of the embodiments in connection with the accompanying drawings, wherein.

DETAILED DESCRIPTION

Figure 1:
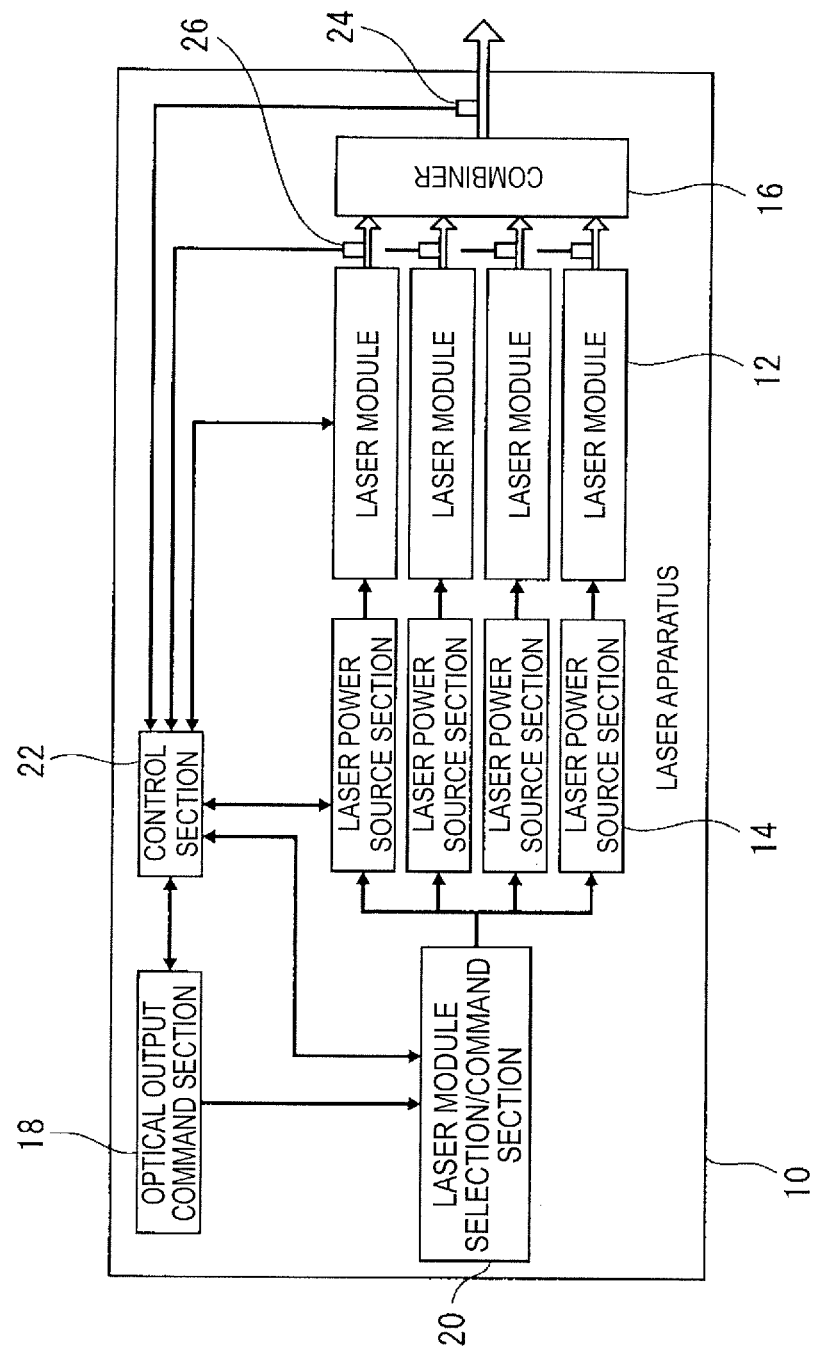
FIG. 1 is a functional block diagram illustrating main sections of a laser apparatus according to a preferred embodiment.

FIG. 1 is a functional block diagram illustrating main sections of a laser apparatus according to a preferred embodiment of the present disclosure. A laser apparatus 10 is, for example, a laser machining machine, and includes: a plurality of laser oscillation modules (laser modules) 12; laser power source sections 14 (normally of the same number as the laser modules 12) that supply driving power to the laser modules 12; a combiner 16 that combines laser beams outputted from (emitted by) the laser modules 12 and that outputs a combined laser beam to the exterior; an optical output command section 18 that generates a first optical output command (value) for the combined laser beam; a laser module selection/command section 20 that selects laser module(s), among the plurality of laser modules 12, to be driven (laser oscillated) on the basis of the first optical output command, and that generates a second optical output command (value) for each of the selected laser module(s); and a control section 22 that controls the laser power source sections 14 and the laser modules 12 on the basis of the second optical output command. Note that the number of the laser modules 12 is determined as appropriate in consideration of the purpose for which the laser apparatus 10 is used, and is a value in the range from 2 to 30, for example, but is not limited thereto.

The laser apparatus 10 also includes a first photodetector 24, such as a photosensor, that detects the actual intensity of the combined laser beam outputted from the combiner 16, and a second photodetector 26, such as a photosensor, that detects the intensity of the laser beam emitted by each of the laser modules 12. The detected values from these photosensors can be fed back into the control section 22, and thus the control section 22 can carry out feedback control based on the intensity of the combined laser beam and the intensities of the laser beams from the modules that have been detected.

The optical output command section 18, the laser module selection/command section 20, and the control section 22 can be provided as a processor, for example, and may be built into the laser apparatus 10 or a control device that controls the laser apparatus 10, or may be provided as a personal computer, etc., that is separate, in terms of appearance, from (the housing of) the laser apparatus 10. At least one of the optical output command section 18, the laser module selection/command section 20, and the control section 22 may include a function or a storage section such as a memory for storing data, etc., for carrying out arithmetic processing, as will be described later.

Figure 2:
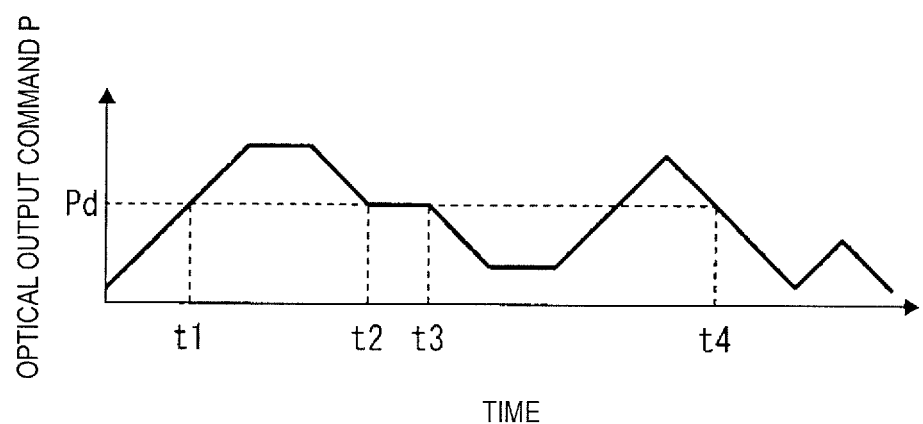
FIG. 2 is a graph illustrating an example of a temporal change in a first optical output command.

Processing carried out in the laser apparatus 10 for switching the number of laser modules to be driven will be described next. Typically, a first optical output command P for the combined laser beam often changes sequentially as illustrated by the graph in FIG. 2, and the number of modules to be used (driven) and the second optical output commands (value) for the modules are changed sequentially in accordance with a change in the first optical output command P.

The number of modules to be driven is uniquely and automatically determined from the first optical output command, in the related art. For example, in the case of FIG. 2, control has been carried out such that the number of modules to be driven is increased upon the first optical output command P rising and reaching a threshold value Pd (time t1), and conversely, the number of modules to be driven is reduced upon the first optical output command P falling and reaching Pd (time t2). However, there are actually cases where, as indicated by the period from time t1 to time t4 in FIG. 2, depending on the laser emission conditions, the first optical output command P changes frequently around the threshold value Pd in a short period of time. In such cases, the actual optical output repeatedly rises slightly above and falls slightly below the threshold value, causing the number of modules to be driven to switch frequently in the period from time t1 to time t4. This destabilizes the optical output, and has led to a drop in machining precision in cases where the laser apparatus 10 is used as a laser machining apparatus. Even when the first optical output command is constant at Pd, as the case from time t2 to time t3, the number of modules to be driven will not be uniquely determined. Rather, two numbers are selectable and the number of modules to be driven may switch meaninglessly and frequently. Such a case may also lead to unstable optical outputs, reduced machining precision, and so on.

Figure 3:
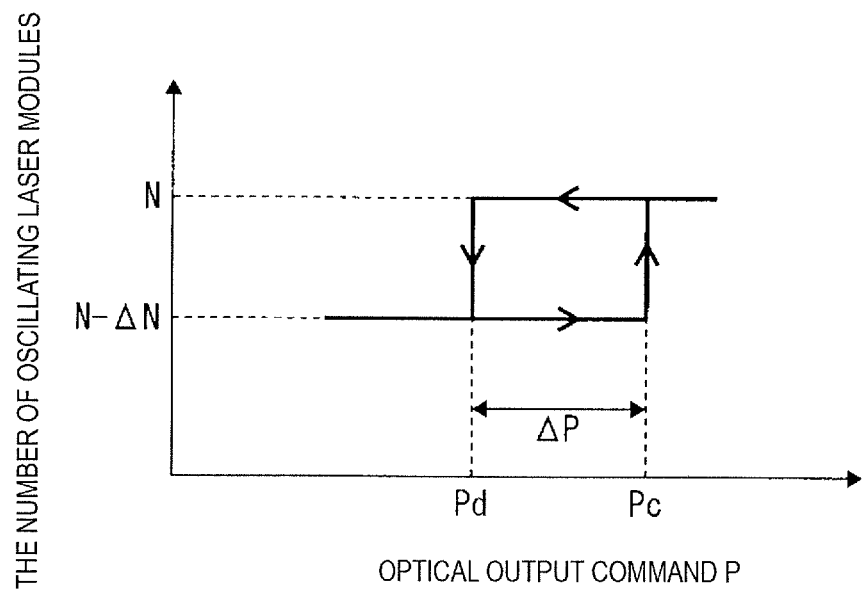
FIG. 3 is a graph illustrating a relationship between a first optical output command and the number of laser-oscillating laser modules.

Accordingly, in the present embodiment, as illustrated in FIG. 3, control is carried out so that a first threshold value serving as a reference when reducing the number of modules to be driven is substantially different from a second threshold value serving as a reference when increasing the number. As one example, in a case where the first optical output command value P changes from 1000 W through 100 W to 1000 W, the number of laser modules 12 to be driven is set to 3 (N=3) when the first optical output command value P is 1000 W, and the number of laser modules 12 to be driven is reduced by 2 to 1 (N−ΔN=1) when the first optical output command value P is 100 W, on the basis of the specifications, etc., of the laser modules 12. Therefore, between 100 W and 1000 W, a threshold value serving as a reference when switching the number of laser modules is to be set for the first optical output command.

Accordingly, in a case where the number of laser modules 12 to be driven is reduced from N, a first threshold value Pd for switching the number is set to 300 W, for example. In other words, when the first optical output command value P drops from 1000 W to 300 W, the number of laser modules 12 to be driven is switched from 3 to 1. On the other hand, in a case where the number of laser modules 12 to be driven is increased to N, a second threshold value Pc at which to switch that number is set to, for example, Pc, which is greater than 300 W by a predetermined value (ΔP) (Pc=Pd+ΔP). Here, ΔP is assumed to be set to 50 W. In other words, when the first optical output command value P rises from 100 W to 350 W, the number of laser modules 12 to be driven is switched from 1 to 3.

As a result of the processing illustrated in FIG. 3, although the number of modules to be driven may drop near the threshold value Pd, the number will not rise. On the other hand, although the number of modules to be driven may rise near the threshold value Pc, the number will not drop. Thus in either case, the number of modules to be driven will not rise or drop frequently, and the output of the combined laser beam will stabilize.

The above-described predetermined value (ΔP) is set so that the threshold values (Pd and Pc) serving as the references when switching the number of laser modules to be driven are substantially different between when the first optical output command value has decreased and when the first optical output command value has increased. As one example, the predetermined value ΔP can be set to a value greater than a fluctuation range of the actual optical output (measured by the first photodetector 24) when the first optical output command value is constant, and can be set to a value of, for example, equal to or more than 3%, equal to or more than 5%, or equal to or more than 10% of the threshold value (300 W, here). The predetermined value ΔP can also be set to a value of, for example, equal to or less than 15%, equal to or less than 20%, or equal to or less than 25% of the threshold value (300 W, here). The predetermined value ΔP can also be set to a fixed value such as 50 W. With the above setting, a combined laser beam having stable optical output is achieved without the number of laser modules to be driven unintentionally switching frequently.

Although the number of laser modules to be driven is switched from 1 to 3 (or its reverse) (i.e., the number of laser modules to be driven is changed by 2 at one time) in the above-described example, the present invention is not limited to the above-described example. For example, the number of laser modules to be driven may be increased or reduced by 1, or may be increased or reduced by equal to or more than 3 at one time, when the first optical output command reaches a given threshold value. Such a relationship between a threshold value and an amount of change in the number at such a threshold value can be determined in advance.

In an actual laser apparatus, there are some cases where differences arise between the second optical output commands to laser modules and the actual optical outputs from such laser modules due to the precision of the adjustments, changes in characteristics following the adjustments, etc. Such differences often vary from module to module. In such cases, the laser module selection/command section 20 may, when the number of laser-oscillating (driven) laser modules 12 is reduced, select in priority a laser module for which the difference between the second optical output command and the actual optical output (detected by the second photodetector 26) is the lowest or is within a predetermined range as a laser module to continue the laser oscillation. Alternatively, the laser module selection/command section 20 may, when the number of laser-oscillating (driven) laser modules 12 is reduced, select in priority a laser module for which the difference between the second optical output command and the actual optical output (detected by the second photodetector 26) is the highest or is outside a predetermined range as a laser module to stop its laser oscillation.

For example, in a case where the first optical output command value is 600 W and the second optical output command values for three laser modules are 200 W each, when the outputs detected by the second photodetector 26 are 230 W, 190 W, and 180 W, respectively, the module having an output of 190 W can be left when reducing the number of laser modules to be driven by 2. Alternatively, when the above-described predetermined range is set to 20 W and the number of laser modules to be driven is reduced by 1, the laser oscillation of the module having an output of 230 W (exceeding the predetermined range) can be stopped. In this manner, leaving a laser module having the lowest or a comparatively low difference between the output command and the actual optical output, as a laser module, to continue laser oscillation increases the output precision of the laser beam after the number is switched, and enables more stable optical outputs.

Additionally, when reducing the number of laser-oscillating laser modules, the laser module selection/command section 20 may select in priority, as a laser module for which laser oscillation is to be stopped, a laser module for which a cumulative driving time, or an effective cumulative driving time that takes into consideration an acceleration coefficient depending on driving conditions, is the longest or is longer than a predetermined amount of time, or a laser module for which it is estimated that, based on optical output characteristics, a remaining lifetime is the shortest or is shorter than a predetermined amount of time. Such processing makes it possible to use in priority a laser module estimated to have a long remaining lifetime, and the lifetime of the laser apparatus as a whole can be lengthened as a result.

For example, the total amount of time a laser module is powered can be used as the cumulative driving time of that laser module. A value obtained by time-integrating a lifetime load coefficient for a standard output command based on the output commands to the respective modules, a time-integrated value of a lifetime load coefficient for a standard optical output based on the actual optical outputs of the modules, etc., can be used as an example of the "effective cumulative driving time that takes into consideration an acceleration coefficient depending on driving conditions". The remaining lifetime based on the optical output characteristics can be found by, for example, periodically measuring the optical output from each module and calculating the degree to which the output has dropped (degraded) from the initial output.

Furthermore, the control section 22 can, according to a predetermined schedule, periodically measure the optical output characteristics of each module on the basis of detected values for the laser modules 12 from the second photodetector 26, and then can send such characteristics to the laser module selection/command section 20. The "optical output characteristics" refers, for example, to a relationship between a current value included in the second optical output command and the actual optical output. On the other hand, the laser module selection/command section 20 can store the optical output characteristics from the control section 22, and then can sequentially update the stored optical output characteristics on the basis of optical output characteristic data send periodically from the control section 22. By periodically measuring the optical output characteristics of the laser modules 12 according to a predetermined schedule and then periodically updating the optical output characteristics stored in the laser module selection/command section 20 in this manner, the laser module selection/command section 20 can more accurately output the second optical output commands to the laser modules 12. Furthermore, a laser module indicating optical output characteristics from which the remaining lifetime is estimated to be shorter can be recognized at an early stage.

In the above-described embodiment, with respect to the switching of the number of laser-oscillating (driven) laser modules 12 based on a change in the first optical output command value P from the optical output command section 18, the threshold value Pc used when increasing the number of the laser-oscillating laser modules 12 to N is set, relative to the threshold value Pd used when reducing the number of the laser-oscillating laser modules 12 from N, to an optical output command value greater than Pd by the predetermined value $\Delta P$ (Pc=Pd+$\Delta P$). However, conversely, the threshold value Pc used when increasing the number of the laser-oscillating laser modules 12 to N can be set, relative to the threshold value Pd used when reducing the number of the laser-oscillating laser modules 12 from N, to an optical output command value less than Pd by the predetermined value $\Delta P$ (Pc=Pd−$\Delta P$). In this case, the number of modules to be driven may increase but will not decrease near the threshold value Pc, whereas the number of modules to be driven may decrease but will not increase near the threshold value Pd. Accordingly, also in this case, the output of the combined laser beam stabilizes, and an effect of improving the machining precision in the case where the laser apparatus 10 is used as a laser machining apparatus is achieved.

According to the present disclosure, in a laser apparatus having a plurality of laser modules, the stability of laser output can be improved by varying a threshold value for a first optical output command used when switching the number of laser-oscillating laser modules between when increasing the number of laser-oscillating laser modules and reducing the number of laser-oscillating laser modules.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A laser apparatus comprising:
a plurality of laser modules;
a laser power source section configured to drive each of the plurality of laser modules;
a combiner configured to combine laser beams emitted by the plurality of laser modules and to output a combined laser beam;
an optical output command section configured to generate a first optical output command with respect to the combined laser beam;
a laser module selection/command section configured to select a laser module to be driven from the plurality of laser modules, based on the first optical output command and to generate a second optical output command for the laser module that has been selected; and
a control section configured to control the laser module and the laser power source section, based on the second optical output command,
wherein, with respect to switching the number of laser-oscillating laser modules in accordance with a change in the first optical output command, the laser module selection/command section is configured to set a second threshold value for the first optical output command, when increasing the number of laser-oscillating laser modules to N, to a value higher or lower, by a predetermined value that is greater than a fluctuation range of an actual optical output, than a first threshold value for the first optical output command serving as a reference, when reducing the number of laser-oscillating laser modules from N.

2. The laser apparatus of claim 1,
wherein, when reducing the number of laser-oscillating laser modules, the laser module selection/command section is configured to select in priority a laser module for which a difference between the second optical output command and an actual optical output is the lowest or the difference is within a predetermined range, as a laser module to continue laser oscillation.

3. The laser apparatus of claim 1,
wherein, when reducing the number of laser-oscillating laser modules, the laser module selection/command section is configured to select in priority, as a laser module for which laser oscillation is to be stopped, a laser module for which either a cumulative driving time or an effective cumulative driving time that takes into consideration an acceleration coefficient depending on a driving condition is the longest or is greater than a predetermined value, or a laser module for which a remaining lifetime based on an optical output characteristic is estimated to be the shortest or lower than a predetermined value.

4. The laser apparatus of claim 1,
wherein the control section is configured to periodically measure, in accordance with a predetermined schedule, an optical output characteristic of the laser module and send the optical output characteristic to the laser module selection/command section, and the laser module selection/command section is configured to store the optical output characteristic and sequentially update the optical output characteristic, based on optical output characteristic data sent from the control section.

* * * * *